United States Patent [19]

Smearing

[11] 4,259,228
[45] Mar. 31, 1981

[54] STORAGE STABLE POLYESTER MONOMER COMPOSITIONS WITH INHIBITOR, PROMOTER, AND STABILIZER

[75] Inventor: Robert W. Smearing, Ballston Lake, N.Y.

[73] Assignee: General Electric Company, Schenectady, N.Y.

[21] Appl. No.: 22,867

[22] Filed: Mar. 21, 1979

[51] Int. Cl.³ .............................................. C08L 67/06
[52] U.S. Cl. ...................... 260/40 R; 206/DIG. 813; 525/14; 525/25; 525/21
[58] Field of Search ............................. 525/14, 25, 26; 260/40 R

[56] References Cited

U.S. PATENT DOCUMENTS

| 2,452,669 | 11/1948 | Levine | 525/26 |
|---|---|---|---|
| 2,593,787 | 4/1952 | Parker | 260/45.4 |
| 3,188,363 | 6/1965 | Amidon et al. | 525/14 |
| 3,302,410 | 2/1967 | McLean | 61/36 |
| 3,324,662 | 6/1967 | McLean | 61/35 |
| 3,324,663 | 6/1967 | McLean | 61/36 |
| 3,360,589 | 12/1967 | Raichle et al. | 525/14 |
| 3,437,715 | 4/1969 | Da Fano | 525/14 |
| 3,731,791 | 5/1973 | Fourcade et al. | 206/47 A |
| 3,819,495 | 6/1974 | Roskott et al. | 204/159.19 |
| 3,840,618 | 10/1974 | Da Fano | 525/14 |

*Primary Examiner*—John C. Bleutge
*Assistant Examiner*—Arthur H. Koeckert
*Attorney, Agent, or Firm*—Morgan, Finnegan, Pine, Foley & Lee

[57] ABSTRACT

Storage stable, fluent, ambient temperature polymerizable resin compositions comprise:

(a) an unsaturated polymerizable polyester resin;
(b) a monomeric polymerizable ethylenic compound;
(c) a gelation inhibitor;
(d) a gelation promoter comprising a tertiary amine; and
(e) an effective, stabilizing amount of a copper compound which is soluble in said composition in combination with a quaternary ammonium salt.

Such compositions containing inert fillers are also disclosed.

14 Claims, No Drawings

STORAGE STABLE POLYESTER MONOMER COMPOSITIONS WITH INHIBITOR, PROMOTER, AND STABILIZER

This invention relates to polymerizable resin compositions. More particularly, it relates to storage stable polymerizable unsaturated polyester compositions containing a copper compound in combination with a quaternary ammonium salt as a stabilizer.

BACKGROUND OF THE INVENTION

A well known family of plastics comprise the so-called polyester resins prepared by esterification of a mixture of ingredients including a polyhydric alcohol and an unsaturated polycarboxylic acid, such materials being combined, typically, with cross-linking monomers typified by styrene and vinyl toluene along with various fillers, flow modifiers, thixotropic agents, flame retardant materials, plasticizers and the like. These are generally stable until mixed with an initiator or curing agent which is typically of the well known peroxide type, whereupon they cure to an infusible, solvent-resistant state. Such materials are described in detail in U.S. Pat. Nos. 3,302,410; 3,324,662; 3,324,663 and 3,731,791, the disclosures of which are incorporated herein by reference.

A uniquely important utility for such polymerizable resins is in the art of "mine roof bolting" which is described in U.S. Pat. No. 3,731,791, and elsewhere. In such use, the polymerizable resin is filled into a cartridge, and the crosslinker is also placed in the cartridge, but separated generally by mechanical means from the resin. A hole is drilled upwardly into the mine roof, one or more of the resin-crosslinker packages is inserted, and a long bolt is rammed into the hole and turned until mixing is complete. This operation breaks the resin package and mixes the resin with the cross-linker. As a result, the bolt is fastened strongly into the hole by the cured resin. What is required in this type of application is cure speed. The faster the resin cures the better. Curing at ambient temperatures, e.g., 10°–30° C. is accelerated in known ways, e.g., by adding to the polymerizable resin composition an accelerator, such as an amine, e.g., a tertiary amine, but this has a serious effect on the storage stability of the uncatalyzed composition.

For example, it has been found that unusually large quantities of t-amine accelerators, e.g., up to about 3% by weight, are needed to give rapid, catalyzed cure times. But these large quantities will gel the uncatalyzed resin composition in only a few days. Although U.S. Pat. No. 3,437,715 suggests that soluble copper salts in combination with quaternary ammonium salts act as inhibitors, these compositions contain only the conventional quinone type inhibitors, and no accelerators of the t-amine type. Applicants' copending application Ser. No. 7,793, filed Jan. 30, 1979, discloses the use of sodium compounds, e.g., sodium carbonate, as stabilizers, but these are not particularly adaptable to long term storage in unfilled systems.

It has now been surprisingly discovered that highly accelerated, but uncatalyzed unsaturated polyester systems can be remarkably storage stabilized by including as a stabilizer a combination of a soluble copper salt and a quaternary ammonium salt. The shelf life of packages filled with such compositions can be extended from only several days without the stabilizer to well in excess of one year with it.

DESCRIPTION OF THE INVENTION

According to the present invention there are provided storage stable, fluent, ambient temperature polymerizable resin compositions comprising (a) an unsaturated polymerizable polyester resin;
(b) a monomeric polymerizable ethylenic compound;
(c) a gelation inhibitor;
(d) a gelation promoter comprising a tertiary amine; and
(e) an effective, stabilizing amount of a copper compound which is soluble in said composition in combination with a quaternary ammonium salt.

The compositions can also be formulated to include
(f) an inert particulate filler.

In preferred features of the invention, stabilizing component (e) comprises from 0.05 to 2.5 and more preferably from 0.1 to 1 parts by weight per 100 parts by weight of the composition. Special mention is made of copper naphthenate combined with benzyltrimethylammonium chloride as stabilizing component (e).

Unsaturated polyester resin component (a) in its broadest aspects will be an esterification product of a $C_1$–$C_6$ alkylene glycol, such as ethylene glycol, propylene glycol, 1,4-butylene glycol, diethylene glycol, mixtures thereof, and the like, with unsaturated dicarboxylic acids or anhydrides, such as maleic anhydride, fumaric acid, itaconic acid, dimethyl maleic acid, etc., optionally with partial replacement of the unsaturated acid with a saturated dicarboxylic acid or anhydride such as phthalic anhydride, isophthalic acid, adipic acid, chlorendic acid, and the like. Modifiers, such as cyclopentadiene, can also be present.

The ethylenically unsaturated monomer component (b) will be, typically, a vinyl aromatic compound, such as styrene, alpha methyl styrene, vinyl toluene, or an acrylic ester, such as methyl methacrylate, mixtures thereof, and the like.

Gelation inhibitor (c) is essential in the manufacturing process to prevent catastrophic gelation when the vinyl monomer is added. It also contributes to control of the gel time, later, when the crosslinker is added. Any conventional material can be used, but preferably the gelation inhibitor will comprise p-benzoquinone, 1,4-naphthoquinone, hydroquinone, mono-t-butyl hydroquinone, mixtures thereof, and the like.

Gelation promoter (d) will comprise any well-known tertiary amine, especially N,N-dimethylaniline; N-N-diethylaniline; N-N-dimentyl-p-toluidene, N,N,N',N'-tetramethylmethylenedianiline, and the like, especially preferably N-N-dimethyl-p-toluidine.

The soluble copper compound can be, in general, any of the resin-soluble organic copper salts described in the above-mentioned U.S. Pat. Nos. 3,437,715 or 3,731,791, both of which are incorporated herein by reference. For example copper naphthenate can be employed, as well as salts of copper with other $C_4+$ organic acids, such as oleic, linoleic, stearic, palmitic and the like, or with abietic acid, pimaric acid, or benzoic acid, etc. Copper naphthenate is preferred because of its ready availability. The quaternary ammonium halide can vary widely in the type employed. Again, reference is made to U.S. Pat. No. 3,437,715 for suitable compounds. See also Parker, U.S. Pat. No. 2,593,787, which is also incorporated herein by reference. The compounds will be of the formula

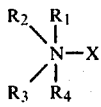

wherein $R_1$, $R_2$, $R_3$ and $R_4$ are, independently organic radicals and X is an acid radical. By way of illustration the quaternary ammonium salt can comprise trimethylbenzylammonium acetate, trimethylbenzylammonium chloride, trimethylbenzylammonium sulfate, and the like. Trimethylbenzylammonium chloride is readily available commercially and is preferred.

The optional inert filler component (f) will be particulate and is preferably inorganic. There can be used limestone, dolomite, silica sand, slate, calcium sulfate, and the like. Preferably the filler is particulate limestone. The filler reduces shrinkage of the resinous mass during polymerization, and adds to the strength of the cured resin. Particles in the size range from less than 1 to 200 mesh are preferable, but not essential.

In general, the systems are made by conventional methods. The ester forming ingredients are mixed and heated in a suitable vessel with a water-entraining solvent, e.g., toluene, at from 110° to 210° C. until water ceases to be evolved. Then any solvent is distilled off and the mixture is cooled, e.g. to 100° to 120° C. and inhibitor (c) is added. On further cooling to 50°–100° C. vinyl aromatic compounds, e.g., vinyl toluene and styrene, are added. The stabilizer (e) and the accelerator (d) are stirred into the resin. Later an inorganic filler is incorporated, e.g., using a dough mixer, a Z-blade mixer, or high shear disperser.

The ratios of components can vary widely. For example, in each 100 parts by weight of unfilled compositions, there will typically be present in admixture: from 50 to 80 parts of polyester component (a); from 48 to 18 parts of vinyl aromatic component (b); from 0.002 to 0.2 parts of inhibitor (c); from 0.5 to 5 parts of promoter (d) and from 0.1 to 1 part of stabilizing component (e). For the filled compositions preferred ranges will comprise, per 100 parts by weight: from 15 to 25 parts of unsaturated polyester component (a), from 5 to 12 parts of polymerizable ethylenically unsaturated component (b); from 0.002 to 0.20 parts of gelation inhibitor (c); from 0.5 to 5 parts of gelation promoter (e); and from 60 to 80 parts of filler component (f).

The compositions are cross-linkable by mixing with a diacyl peroxide catalyst, e.g., benzoyl peroxide, in amounts of up to 10 parts per hundred of resin. The peroxide may be used in the form of pastes, gels, putties, or solid rods to suit various requirements. Organic extenders and thixotropic additives can also be used in conventional amounts.

DESCRIPTION OF THE PREFERRED EMBODIMENTS

The invention is illustrated but not limited by the following examples. All parts are by weight.

EXAMPLE 1

A polyester is prepared by mixing 21.4 parts by weight of maleic anhydride, 17.4 parts by weight of phthalic anhydride with 13.4 parts by weight of propylene glycol and 18.7 parts by weight of diethylene glycol, adding 0.1 parts of triphenyl phosphite and heating until esterification is substantially complete. The batch is cooled and thoroughly blended with a small amount, 0.073 parts, of gelation inhibitor, 1,4-naphthoquinone. Then the resin is cut with 13.0 parts of vinyl toluene and 13.0 parts of styrene. As stabilizer there are added 0.027 parts of 8% copper naphthenate (NUODEX) and 0.165 parts of 50% aqueous trimethylbenzyl ammonium chloride (Ashland, Variquat B-200). Finally, N,N-dimethyl-p-toluidine, 0.874 parts, is added as a cure accelerator.

This composition is stable under storage conditions for at least a year. In contrast, if the copper naphthenate and benzyl trimethylammonium chloride are omitted, the composition gels in several days. The composition can be filled, e.g., with 73 parts of limestone per 100 parts total. It can be cured with benzoyl peroxide rapidly in suitable curing quantities, e.g., 1–10% by weight, based on resin.

It is obvious that many variations are possible in light of the above-detailed description. For example, the polyester can comprise 65/35 mole % fumaric acid-phthalic anhydride and propylene glycol. The inhibitor (c) can comprise p-benzoquinone, hydroquinone or mono-t-butylhydroquinone. The accelerator (d) can comprise N,N-dimethylaniline or a mixture thereof with N,N-dimethyl-p-toluidine. Instead of particulate limestone, there can be substituted dolomite, silica, slate, calcium sulfate of a mixture. The ratio of copper to quaternary ammonium compound can vary over the range of 0.1 to 10 of the former to 99.9 to 90 parts of the latter. All obvious variations are within the full intended scope of the appended claims.

I claim:

1. A storage stable, fluent, ambient temperature, peroxide curable, polymerizable resin composition comprising:
   (a) an unsaturated polymerizable polyester resin;
   (b) a monomeric polymerizable ethylenic compound;
   (c) a gelation inhibitor comprises p-benzoquinone, 1,4-naphthoquinone, hydroquinone, mono-t-butyl hydroquinone or a mixture thereof;
   (d) a gelation promoter comprising a tertiary amine; and
   (e) an effective, stabilizing amount of a copper compound which is soluble in said composition in combination with a quaternary ammonium salt.

2. A composition as defined in claim 1 wherein said stabilizing component (e) comprises from about 0.05 to about 2.5 parts by weight per 100 parts by weight of the composition.

3. A composition as defined in claim 2 wherein said stabilizing component (e) comprises from about 0.1 to about 1 parts by weight per 100 parts by weight of the composition.

4. A composition as defined in claim 1 wherein said stabilizing component (e) comprises copper naphthenate and trimethylbenzylammonium chloride.

5. A composition as defined in claim 1 wherein said unsaturated polyester resin component (a) comprises the reaction product of (i) an unsaturated dibasic carboxylic acid and (ii) an alkylene glycol.

6. A composition as defined in claim 5 wherein said unsaturated polyester resin component (a) comprises the reaction product of (i) maleic acid, maleic anhydride or fumaric acid, alone, or in further combination with phthalic anhydride and (ii) at least one alkylene glycol of from two to six carbon atoms.

7. A composition as defined in claim 6 wherein said unsaturated polyester component (a) comprises the reaction product of (i) maleic anhydride in combination with phthalic anhydride and (ii) propylene glycol in combination with diethylene glycol.

8. A composition as defined in claim 1 wherein said monomeric polymerizable ethylenic compound (b) is a vinyl aromatic compound.

9. A composition as defined in claim 8 wherein said vinyl aromatic compound (b) comprises styrene, a vinyl toluene, or a mixture thereof.

10. A composition as defined in claim 1 wherein said gelation promotor component (d) comprises N,N-dimethyl aniline, N,N-dimethyl-p-toluidine, or a mixture thereof.

11. A composition as defined in claim 1 which also includes (f) an inert filler comprising particulate limestone, dolomite, silica, slate, calcium sulfate or a mixture of any of the foregoing.

12. A composition as defined in claim 11 wherein said inert filler (f) comprises particulate limestone.

13. A composition as defined in claim 1 comprising per 100 parts by weight:
from 50 to 80 parts of component (a);
from 48 to 18 parts of component (b);
from 0.002 to 0.20 parts of component (c);
from 0.5 to 5 parts of component (d); and
from 0.1 to 1 parts of component (e).

14. A filled composition as defined in claim 11 comprising per 100 parts by weight:
from 15 to 25 parts of component (a);
from 5 to 12 parts of component (b);
from 0.002 to 0.20 parts of component (c);
from 0.5 to 5 parts of component (d);
from 0.01 to 1 parts of component (e); and
from 60 to 80 parts of component (f).

* * * * *

UNITED STATES PATENT AND TRADEMARK OFFICE
CERTIFICATE OF CORRECTION

PATENT NO. : 4,259,228
DATED : March 31, 1981
INVENTOR(S) : Robert W. Smearing

It is certified that error appears in the above—identified patent and that said Letters Patent is hereby corrected as shown below:

In Col. 4, line 63, "furmaric" should read -- fumaric --.

Signed and Sealed this

Fifteenth Day of September 1981

[SEAL]

Attest:

Attesting Officer

GERALD J. MOSSINGHOFF

Commissioner of Patents and Trademarks